July 31, 1951  F. B. CURTENIUS  2,562,700
PEDAL ASSEMBLY FOR BRAKE LEVERS
Filed May 10, 1950
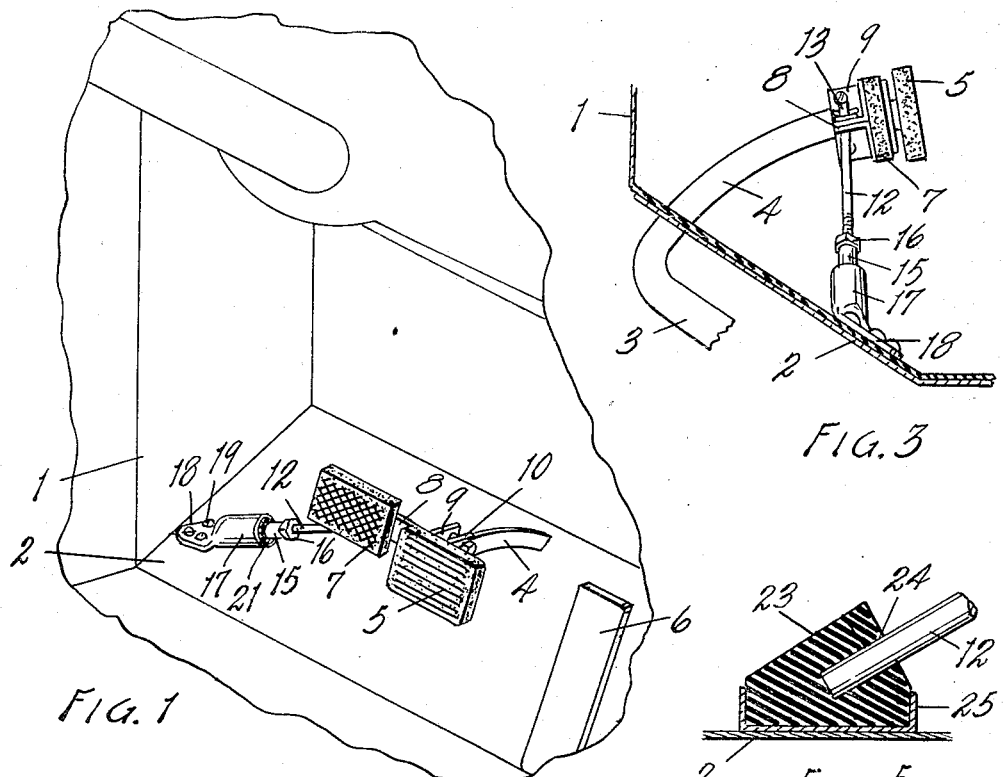
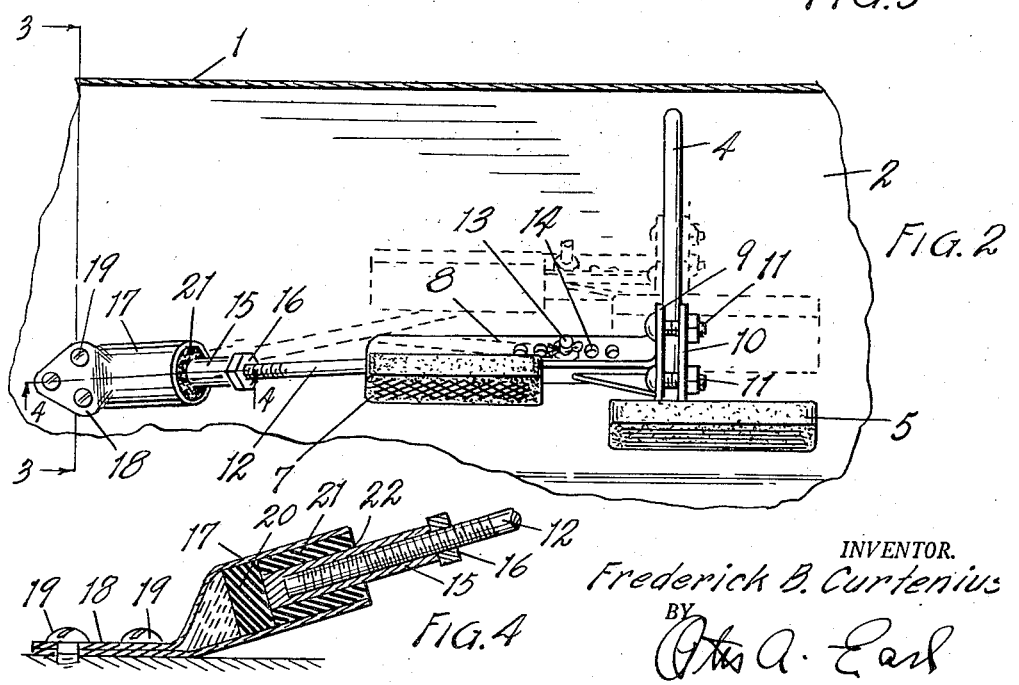
INVENTOR.
Frederick B. Curtenius
BY
Otis A. Earl
Attorney Patented July 31, 1951

2,562,700

UNITED STATES PATENT OFFICE 2,562,700

PEDAL ASSEMBLY FOR BRAKE LEVERS

Frederick B. Curtenius, Kalamazoo, Mich.

Application May 10, 1950, Serial No. 161,121

7 Claims. (Cl. 74—479)

This invention relates to improvements in pedal assemblies for brake levers.

The main objects of this invention are:

First, to provide a pedal assembly for levers which is well adapted for embodiment in motor vehicles, particularly in automobiles now in extensive use, and without material modifications in the structure thereof.

Second, to provide a brake pedal assembly which permits the operator to control the brake with the left foot thereby permitting the maintaining of the right foot on the throttle or accelerator pedal.

Third, to provide a pedal assembly having these advantages which may be economically produced and installed.

Objects relating to details and economies of the invention will appear from the description to follow. The invention is pointed out in the claims.

A preferred embodiment of the invention is illustrated in the accompanying drawing, in which:

Fig. 1 is a fragmentary inside perspective view of a motor vehicle with the pedal assembly of my invention in operative installed relation, various parts being shown conventionally.

Fig. 2 is an enlarged fragmentary plan view with the parts shown in normal position by full lines and in one actuated position by dotted lines.

Fig. 3 is a fragmentary view partially in section on a line corresponding to line 3—3 of Fig. 2.

Fig. 4 is an enlarged fragmentary view partially in section on a line corresponding to line 4—4 of Fig. 2.

Fig. 5 is a fragmentary view of a modified form or embodiment of my invention.

Many motor vehicles, particularly automobiles now extensively used, are without a clutch pedal and the brake pedal is associated with the throttle or accelerator pedal so that both are designed to be operated by the right foot which results in the driver being frequently required to shift his right foot from one pedal to the other. My invention is designed to provide a structure which permits the operation of the brake pedal by the left foot and this without changing the design or arrangement of the control parts of the vehicle.

In the accompanying drawing 1 represents the body of the motor vehicle and 2 the footboard thereof. The brake lever 3 is provided with an arm 4 disposed through the footboard. The brake lever is provided with a main pedal 5. The throttle pedal, shown conventionally at 6, is positioned adjacent to the main brake pedal 5 so that the operator can shift the right foot from the throttle to the brake pedal and vice versa. To enable operation of the brake pedal by the left foot to avoid such shifting I provided an auxiliary pedal 7 which is carried by the bracket 8 having a clamp 9 at its inner end by which it may be adjustably clamped to the brake lever arm 4 below the main pedal thereof thus supporting the auxiliary pedal 7 to the left of the main pedal and in position to be operated by the left foot. The clamp 9 comprises a clamping plate 10 and clamping bolts 11 which provide means for effectively mounting the auxiliary pedal.

Owing to the fact that the auxiliary pedal is offset substantially from the plane of the brake lever there is a tendency to distort the brake lever or to impart lateral distorting thrust thereto. To counteract that I provide a thrust or torsion rod 12 terminating at its inner end in an angularly disposed portion 13 selectively engageable at its inner end with one of the longitudinally spaced series of holes 14 in the bracket 8. The outer end of this rod 12 is yieldably and swingably supported. In the embodiment shown in Fig. 4, the outer end of the rod 12 is provided with a tubular extension 15 telescoped over the rod and adjusted therein by means of the nut 16 threaded upon the rod and engaging the inner end of the extension. This provides for accurately adjusting the rod as desired and it may in many instances constitute the sole adjustment, that is, the connection for the rod to the bracket may be omitted. The yieldable and swingable support for the rod in the embodiment shown in Figs. 1 to 4 comprises the tubular holder or socket 17 having an attaching portion 18 adapted to receive the screws 19 for attachment to the floorboard. The thrust abutment member is in the embodiment illustrated in these figures made up of an inner member 20 against which the end of the thrust rod abuts, and the member 21 having a bore 22 therein receiving this thrust rod. The members 20 and 21 are formed of rubber or similar resilient material. This results in a swingably and yieldably supporting rod which allows free movement of the brake lever and effective distortion of the brake member and the connections, or effective in preventing rattling.

In the embodiment shown in Fig. 5, the thrust block 23 is formed of rubber and has a bore 24 therein receiving the end of the rod 12. The adjustable extension 15 presented in the preferred embodiment is omitted in this structure. The abutment member 23 is supported in a socket-like holder 25 which is suitably secured to the floorboard.

I have illustrated and described what I regard as a highly practical commercial embodiment of my invention. I have not attempted to illustrate or describe other embodiments or adaptations as it is believed that this disclosure will enable those skilled in the art to embody or adapt my invention as may be desired.

Having thus described my invention, what I claim is new and desire to secure by Letters Patent is:

1. In combination with a brake lever assembly for motor vehicles comprising a brake lever provided with a pedal arm adapted to be disposed through the footboard of a motor vehicle and having a main foot pedal thereon, of an auxiliary foot pedal provided with a supporting bracket having a clamp adjustably engaging said lever arm below said main foot pedal, said bracket having a longitudinal series of holes therein, a downwardly inclined thrust rod selectively engageable with said holes, a resilient thrust abutment member for the outer end of said rod having a bore therein in which the end of said rod is engaged whereby the rod is swingably and yieldably supported, and a support for said abutment member adapted for attachment to a floorboard of a vehicle in spaced relation from the brake arm.

2. The combination with a brake lever for a motor vehicle provided with a main foot pedal, of an auxiliary foot pedal provided with a supporting bracket having a clamp engaging said lever below said main foot pedal, said bracket having a longitudinal series of holes therein, a downwardly inclined thrust rod selectively engageable with said holes, a resilient thrust abutment member with which the outer end of said rod is engaged for swingably and yieldably supporting the rod, and a support for said abutment member adapted for attachment to a floorboard of a vehicle in laterally spaced relation to the brake lever and having a socket in which said abutment member is disposed.

3. The combination of a brake lever for motor vehicles provided with a main foot pedal, an auxiliary foot pedal provided with a supporting bracket adapted to be mounted on said brake lever below the main foot pedal and having a plurality of holes spaced longitudinally relative to the auxiliary foot pedal, a thrust rod selectively engageable with said holes, and a thrust abutment for the outer end of said rod by which the rod is yieldably and swingably supported.

4. An auxiliary pedal for brake levers having a main pedal, the auxiliary pedal being provided with means for connection to the brake lever to support the auxiliary pedal at one side of the main pedal, a thrust rod swingably connected to said auxiliary pedal and to the brake lever through the connection for the auxiliary pedal to the brake lever, said thrust rod having an extensible portion in telescoping engagement with its outer end, threaded means for adjusting and for securing said extensible portion in its adjusted position, a tubular support for the outer end of said rod, and a resilient abutment within said tubular support receiving the said thrust rod extension and yieldably and swingably supporting said thrust rod.

5. An auxiliary pedal for brake levers having a main pedal, the auxiliary pedal being provided with means for connection to the brake lever to support the auxiliary pedal at one side of the main pedal, a thrust rod swingably connected to said auxiliary pedal and to the brake lever through the connection for the auxiliary pedal to the brake lever, threaded means for adjusting and for securing said extensible portion in its adjusted position, a tubular support for the outer end of said rod, and a resilient abutment within said tubular support receiving the said thrust rod and yieldably and swingably supporting said thrust rod.

6. An auxiliary pedal for brake levers having a main pedal, the auxiliary pedal being provided with means for connection to the brake lever to support the auxiliary pedal at one side of the main pedal, an extensible thrust rod swingably connected to said auxiliary pedal and to the brake lever through the connection for the auxiliary pedal to the brake lever, and a resilient abutment yieldably and swingably supporting said thrust rod.

7. An auxiliary pedal for brake levers having a main pedal, the auxiliary pedal being provided with means for connection to the brake lever to support the auxiliary pedal at one side of the main pedal, a thrust rod swingably connected to said auxiliary pedal and to the brake lever through the connection for the auxiliary pedal to the brake lever, and a resilient abutment yieldably and swingably supporting said thrust rod.

FREDERICK B. CURTENIUS.

REFERENCES CITED

The following references are of record in the file of this patent:

UNITED STATES PATENTS

| Number | Name | Date |
| --- | --- | --- |
| 1,444,027 | Frederick | Feb. 6, 1923 |
| 2,078,324 | Griffiths | Apr. 27, 1937 |